R. H. BUTTERS.
GIN SAW SHARPENING MACHINE.
APPLICATION FILED APR. 24, 1916.
1,298,002.
Patented Mar. 25, 1919.
5 SHEETS—SHEET 5.
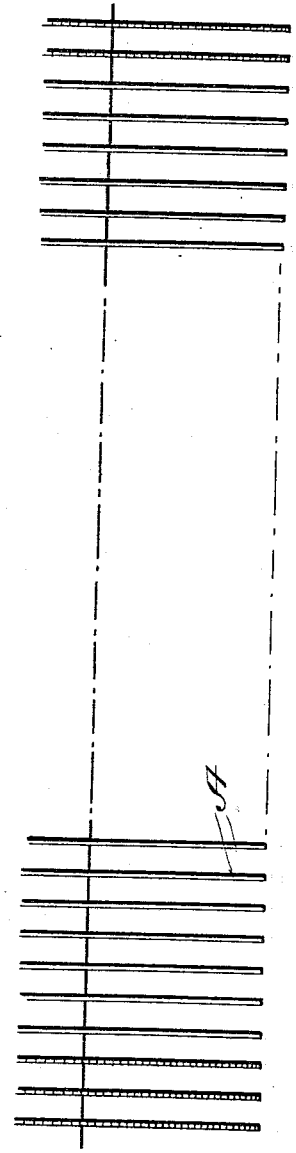
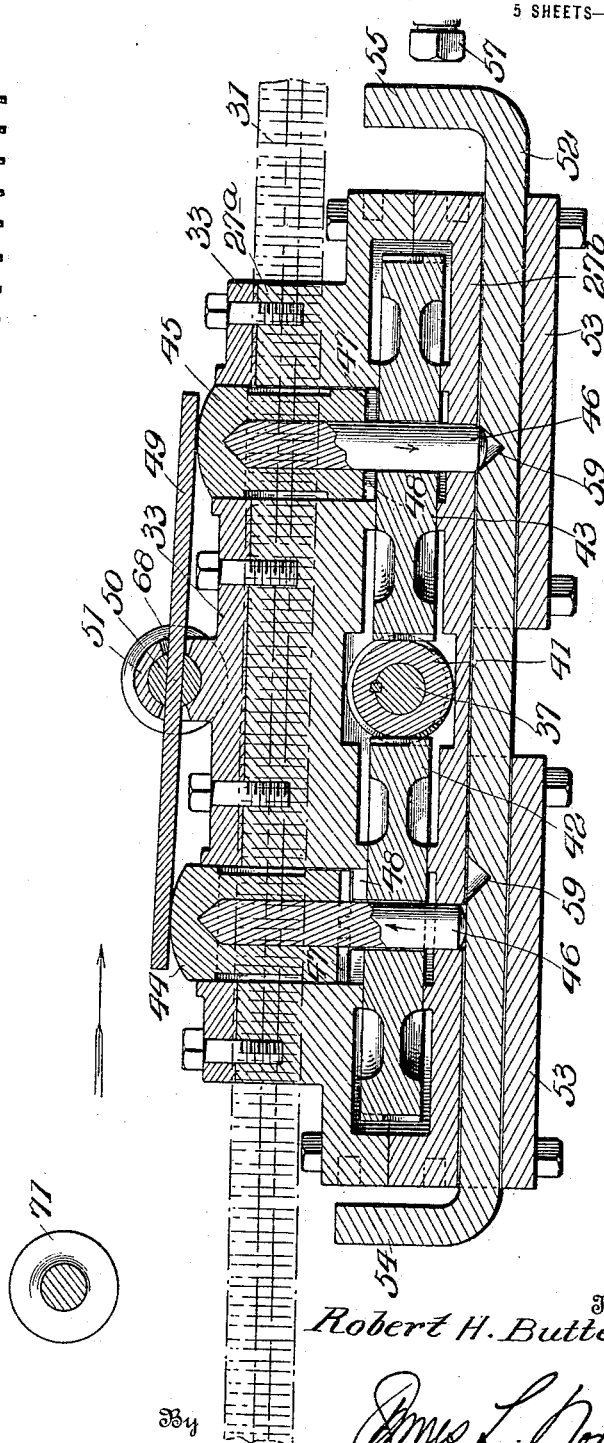
Witness
Inventor
Robert H. Butters.
By
Attorney

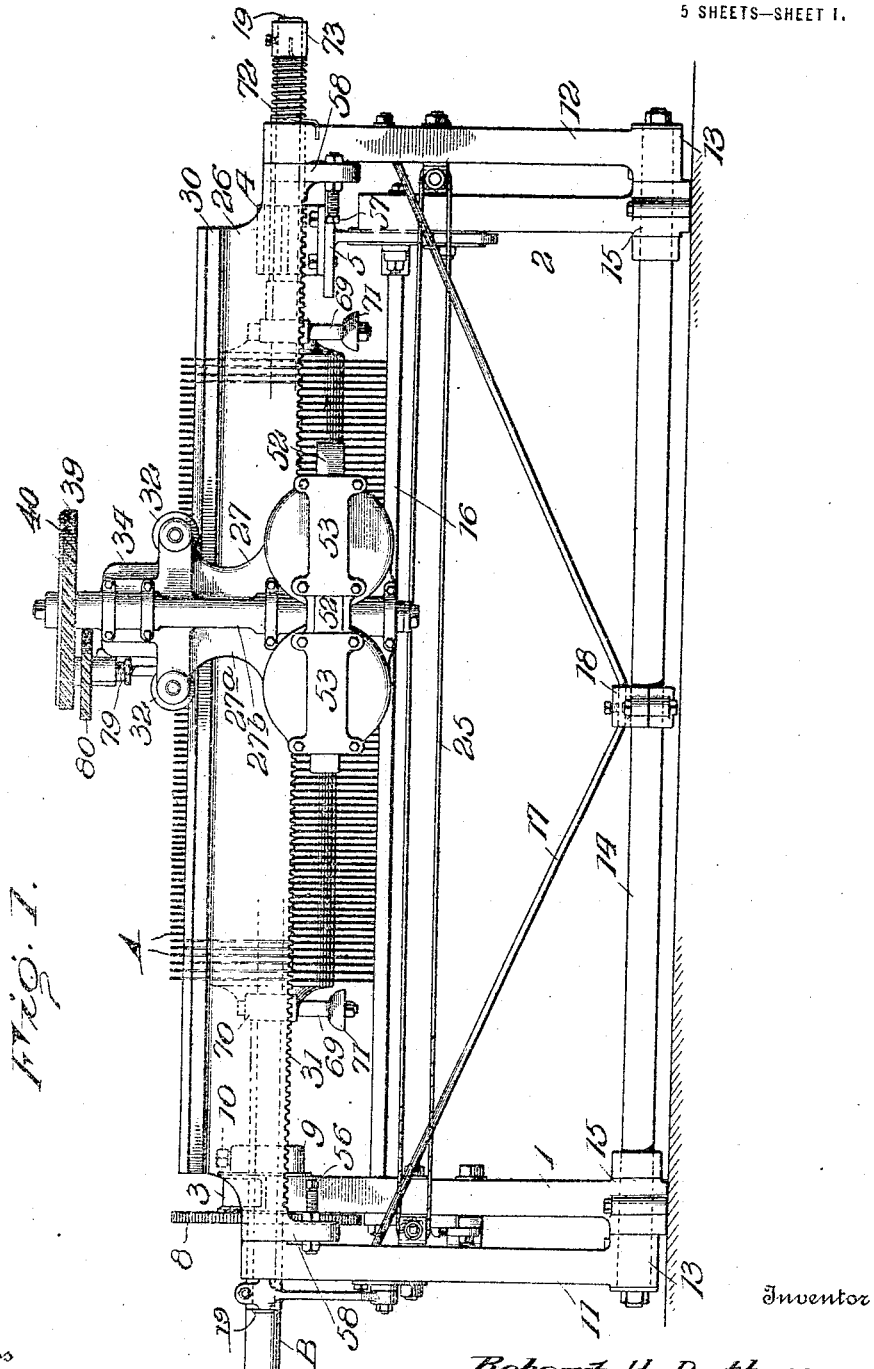

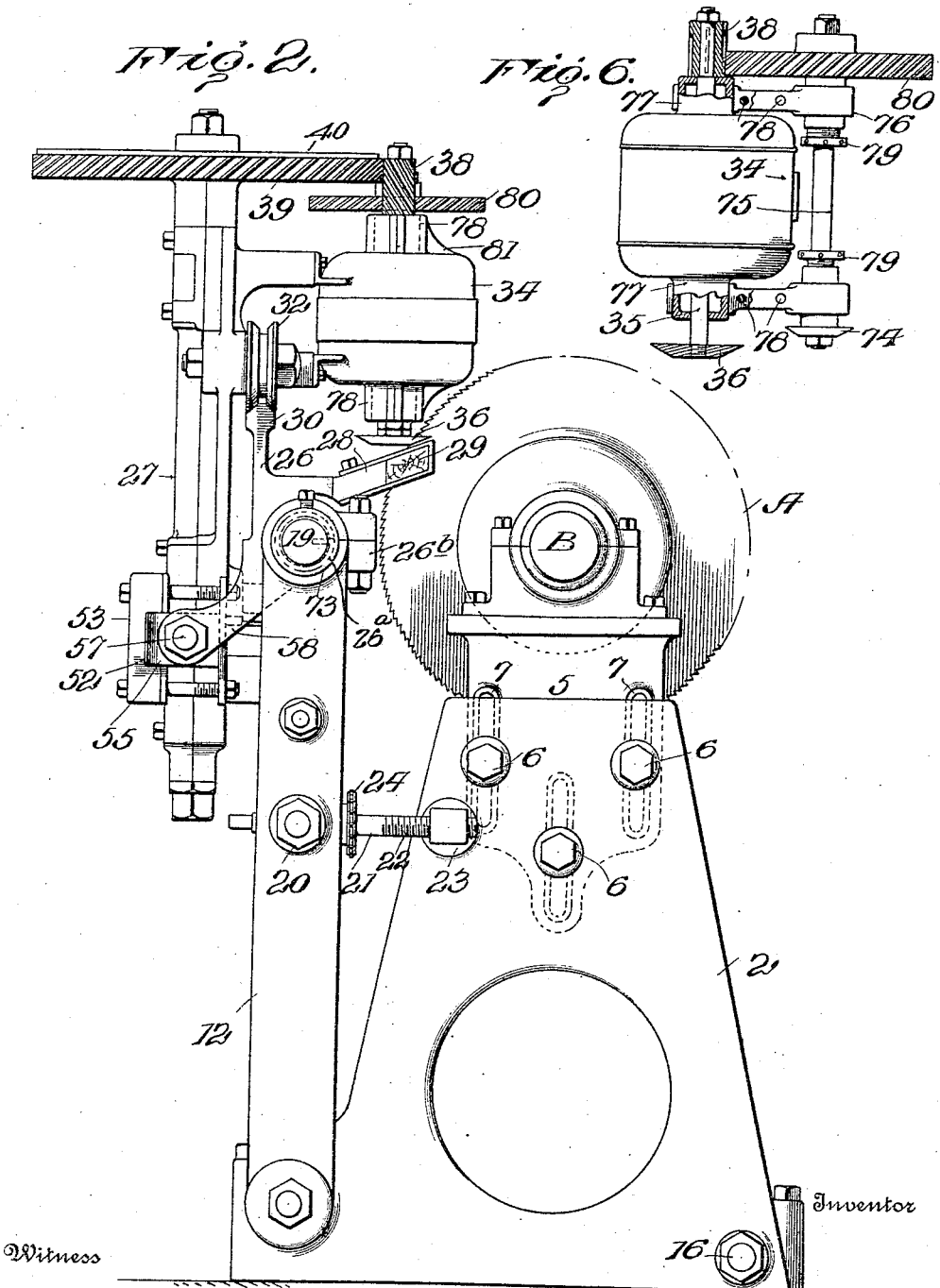

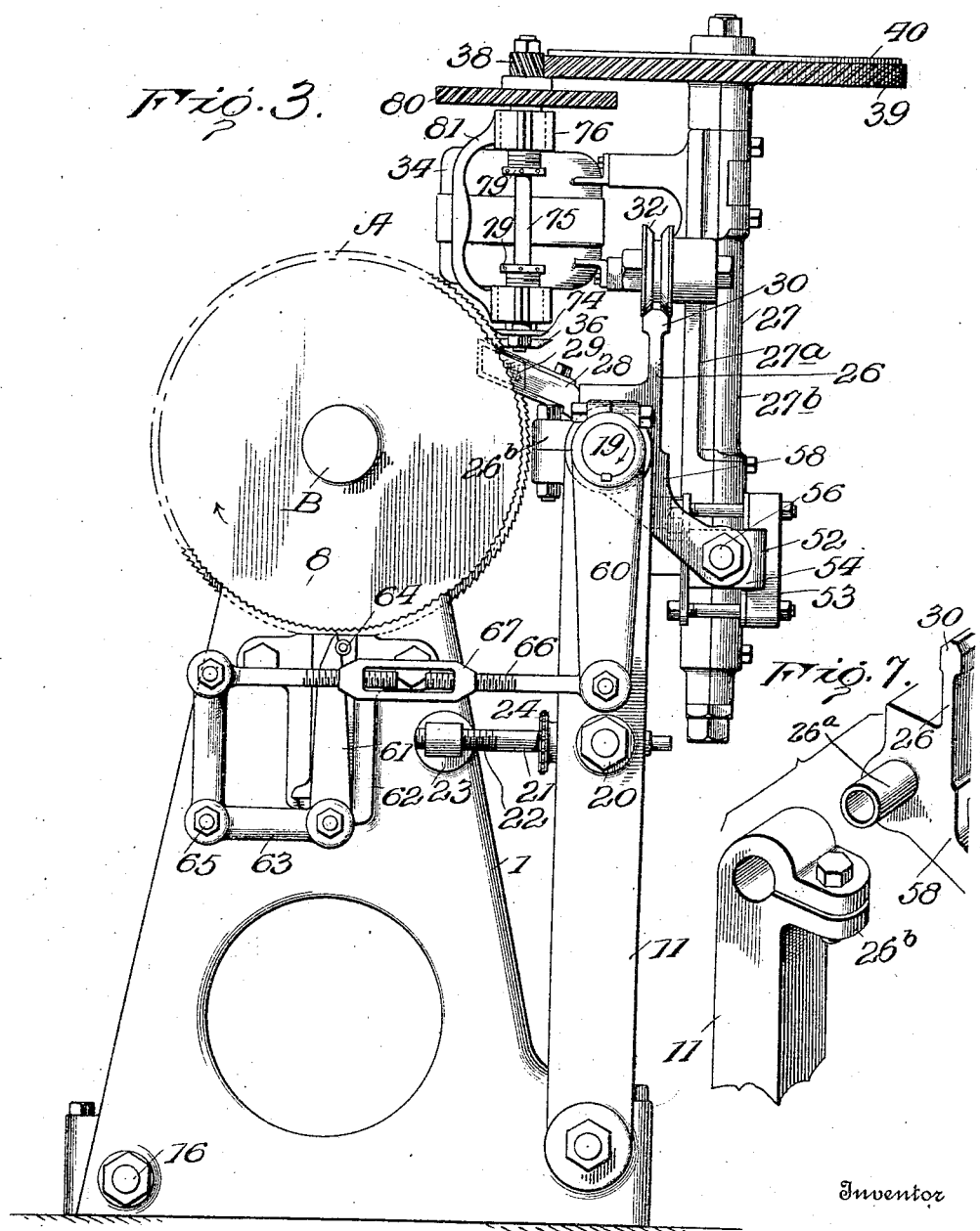

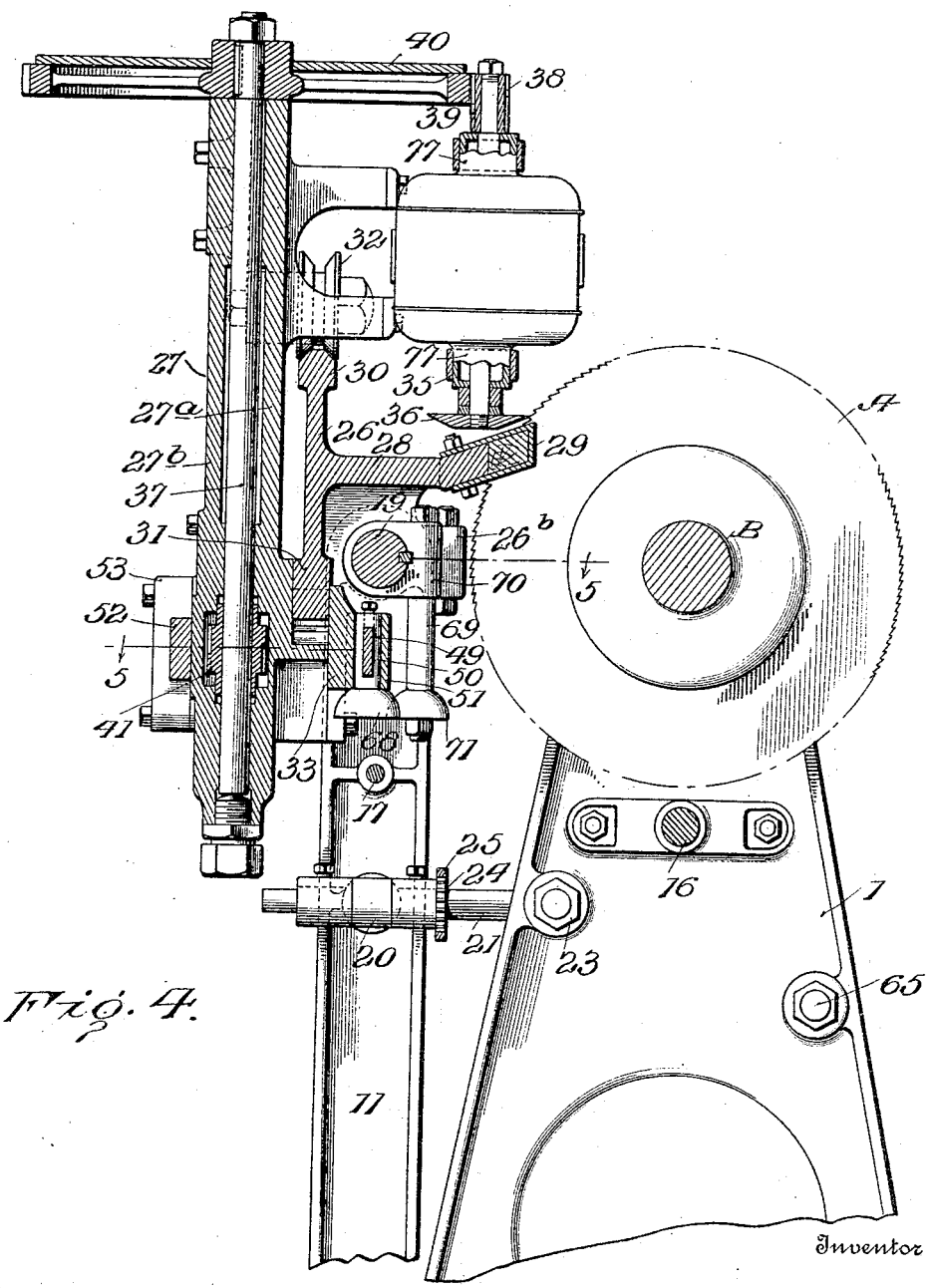

UNITED STATES PATENT OFFICE.

ROBERT H. BUTTERS, OF ATLANTA, GEORGIA, ASSIGNOR TO THE BUTTERS-CAMP MFG. CO., A CORPORATION OF GEORGIA.

GIN-SAW-SHARPENING MACHINE.

1,298,002.  Specification of Letters Patent.  Patented Mar. 25, 1919.

Application filed April 24, 1916.  Serial No. 93,298.

*To all whom it may concern:*

Be it known that I, ROBERT H. BUTTERS, a citizen of the United States, residing at Atlanta, in the county of Fulton and State of Georgia, have invented new and useful Improvements in Gin-Saw-Sharpening Machines, of which the following is a specification.

This invention relates to improvements in gin saw sharpening machines.

The invention proposes a machine in which the sharpening agency is automatically operated and is combined with a carrier which is automatically moved from one end of the cylinder of saws to the other and is automatically reversed on the completion of its movement in either direction; and in which the cylinder of saws is automatically fed or rotated through a distance corresponding to the interval of the saw teeth when the said carrier reaches the limit of its movement in either direction.

The objects of the invention, briefly stated, are to provide a gin saw filing machine which will accomplish its work in the most efficient manner and in a minimum period of time; which will be wholly automatic in all of its operations; which may be readily adapted for saws of different diameters or whose teeth vary in pitch; and in which the exact circular curvature of the saw edge will be preserved and the teeth will be uniformly sharpened and milled.

The invention consists in certain novel features of structure, combination and relation, which, together with the above and other objects and advantages, will appear as the description proceeds.

An embodiment of the invention is illustrated in the accompanying drawings, wherein:—

Figure 1 is a front elevation of a machine in which the features of the invention are incorporated;

Fig. 2 is an elevation of the right end thereof (Fig. 1 of the drawings being considered);

Fig. 3 is an elevation at the left end thereof (Fig. 1 of the drawings being considered);

Fig. 4 is a vertical cross-sectional view;

Fig. 5 is a detail sectional view on the line 5—5 of Fig. 4;

Fig. 6 is a detail elevation showing the relation between the rotary grinding wheel and the rotary gummer; and Fig. 7 is a view in perspective of one end of the track plate and the means for securing said plate at any desired angle.

Similar characters of reference designate corresponding parts throughout the several views.

The cylinder of gin saws A mounted, as usual, upon a shaft B, is supported by end standards 1 and 2. The shaft B extends through a bearing 3 formed with the standard 1 at the upper end thereof and through a bearing 4 supported by the standard 2, the bearing 4 being mounted on a bracket 5 which is connected to the standard 2 for vertical adjustment, the bolts 6 by which the bracket 5 is clamped extending through vertical slots 7 in said bracket.

The standard 1 carries a ratchet wheel 8 which forms an element of the saw feeding mechanism to be hereafter described in detail. The ratchet wheel 8 adjoins the outer face of the standard 1 and its hub 9 fits within the bearing 3 and beyond said bearing is made fast to the shaft B by a screw or equivalent connection 10.

The elements of the machine (excepting certain parts of the saw feeding mechanism) are supported by a pair of arms 11 and 12 which, as shown and preferred, are pivotally mounted, for this purpose being provided at their lower ends with collars 13 fitted on the ends of a transverse rod 14 which is journaled in bearings 15 formed with the standards 1 and 2. The standards 1 and 2 are transversely braced relatively to one another by the rod 14 aforesaid and by transverse bars 16. The arms 11 and 12 are transversely braced relatively to one another by a V-shaped connecting rod 17 which is secured at its center by a clamping collar 18 to the rod 14.

The upper ends of the arms 11 and 12 are formed to receive the bearings for a transverse shaft 19 which participates in the saw-feeding operation.

The arms 11 and 12 are held against pivotal movement by means of certain connections between them and the respectively adjacent standards 1 and 2; and these connections include elements whereby said arms may be adjusted within certain limits for the purpose of varying their positions relative to the standards 1 and 2. Each of the arms 11 and 12 is provided with a laterally arranged swiveled bearing 20 in which is journaled a link 21 having a threaded end 22 which works in a swiveled nut 23 laterally arranged on the adjacent standard. It will be obvious that by rotating the links 21 in their bearings 20 the arms 11 and 12 will be positioned nearer to or farther from the standards 1 and 2, accordingly as the said links are turned in one direction or the other. In order to provide for the uniform and simultaneous rotation of the links 21 in effecting adjustments of the positions of the arms 11 and 12, each of said links is provided with a sprocket 24 and the sprockets 24 are connected by a chain 25. Either or both of the links 21 may have a forwardly projecting end which is squared to receive a wrench or crank handle. The planes of the arms 11 and 12 are beyond the planes of the standards 1 and 2. The bearings 20 are, therefore, arranged at the inner sides of the arms 11 and 12 and the nuts 23 are arranged at the outer sides of the standards 1 and 2.

A transverse track plate 26 extends for the full distance between the arms 11 and 12 and has at its ends trunnions 26ª which provide bearings for the shaft 19 and are fitted in openings in the arms 11 and 12. Said arms are provided with split boxes 26ᵇ which, when the plate 26 has been set at the angle desired, are tightened on the trunnions 26ª to hold said plate against turning. The plate 26 supports the carrier, designated generally as 27, for the saw sharpening instrumentality, said carrier being movable lengthwise of said plate. The plate 26 has formed therewith a rearward extension 28 which bears against the edges of the saws A and which is provided with spacing blocks 29 preferably of wood to project between the saws and brace them transversely during the operation of the machine.

For the purpose of coöperation with the carrier 27, the plate 26 has formed therewith along its upper edge a rail 30 and along its lower edge a rack bar 31, the rail 30 and rack bar 31 extending for substantially the full length of said plate. The carrier 27 includes a base plate 27ª and a cover plate 27ᵇ. The base plate 27ª carries near its upper end a pair of grooved pulleys 32 which operate on the rail 30 and near its lower end a guide plate 33 which overlies the rack bar 31 at the rear side thereof and, therefore, provides a longitudinal channel at the rear side of the base plate 27ª into which the rack bar 31 projects.

The base plate 27ª supports at the rear thereof an electric motor 34 having its shaft 35 vertically disposed. The motor 34 overhangs the saws A and its shaft 35 carries at its lower end a horizontal grinding wheel 36 which grinds the front and back faces of the saw teeth.

The motor 34 is utilized to effect the automatic propulsion of the carrier 27 from one end of the machine to the other and the gearing by which the said carrier is driven from said motor is constructed to provide for the automatic reversal of the carrier when the latter reaches the limit of its movement in either direction. This gearing includes a vertical shaft 37 which is journaled in the gear casing provided by the plates 27ª and 27ᵇ and located at the front side of the plate 27ª. The motor shaft 35 has at its upper end a relatively small pinion 38 which meshes with and drives a relatively large gear wheel 39 mounted on the upper end of the shaft 37. The gears 38 and 39 are preferably of helical type and the gear wheel 39 is preferably provided with a superposed guard plate 40. The reversing gearing, of which the shaft 37 is an element, is preferably constructed as shown and includes a spiral gear 41 mounted on the shaft 37 near its lower end and helical gear wheels 42 and 43 in mesh with said spiral gear and arranged at opposite sides thereof. Obviously, a worm may be substituted for the spiral gear 41 and worm wheels for the helical gears 42 and 43. The gear wheels 42 and 43 are employed to drive pinions 44 and 45, respectively, and which mesh with the teeth of the rack bar 31, the arrangement being such that when the pinion 44 is driven from the gear wheel 42, of which it is a companion, the pinion 45 will rotate idly and vice versa. The pinions 44 and 45 are mounted on shafts 46 which have a sliding fit in central openings of the gear wheels 42 and 43 and which project through openings in the cover plate 27ᵇ. The pinions 44 and 45 are formed at their inner ends with clutch members 47, preferably composed of radial teeth, which co-act with similar clutch members 48 formed with the hubs of the gear wheels 42 and 43. The pinions 44 and 45 are slidably mounted in bearings provided therefor in the base plate 27ª and in the guide plate 33 and project beyond said guide plate. The projecting ends of the pinions 44 and 45 are engaged by a spring bar 49 carried by a vertical pintle or rock shaft 50 journaled in a bearing 51 at the rear side of the guide plate 33. The projecting ends of the shaft 46 are acted on by a transversely disposed reversing bar 52 which is mounted for transverse sliding movement along the front of the plate 27ᵇ in keepers or guides 53. The bar 52 is provided at its ends with angular extensions 54 and 55 which, respectively, engage the laterally projecting operating pins 56 and 57 arranged at the ends of the plate 26 and carried by brackets 58 which project forward and downward from said plate. The reversing bar 52 is provided with recesses 59 formed to receive the ends of the shafts 46 and spaced from one another by a distance equal to the distance between the shafts 46 minus the diameter of one of said shafts.

It will be apparent that when the carriage 27 reaches the limit of its movement at the right end of the machine, the extension 55 of the bar 52 will engage the pin 57 which will thereby shift said bar to the left. The bar 52 in its movement to the left will force the shaft 46 of the pinion 45, and therewith said pinion, outward against the pressure of the spring 49 which, when the shaft 46 of the pinion 47 alines with the recess 59, will effect an inward movement of the pinion 44. The outward movement of the pinion 45 will disengage said pinion from the gear wheel 43 and the inward movement of the pinion 44 will engage said pinion with the gear wheel 42. The pinion 44 will then be driven from the shaft 37 and the pinion 45 will run idly, in consequence of which the movement of the carriage will be reversed. When the carriage 27 reaches the limit of its movement at the left end of the machine, the extension 54 of the bar 52 will engage the pin 56 which will thereby shift the bar 52 to the right. The movement of the bar 52 to the right will, in the manner described, effect the disengagement of the pinion 44 from the gear wheel 42 and the engagement of the pinion 45 with the gear wheel 43, as shown. Thereupon, the movement of the carriage will be reversed and the carriage will move toward the right end of the machine. The saw feeding mechanism is, in the embodiment shown, operated by a rocking movement of the shaft 19 which, for this purpose, is provided at its end adjacent the wheel 8 with a depending arm 60. The said mechanism includes in addition to the arm 60 and the wheel 8 a vertically slidable feed pawl 61 working in a guide 62 secured on the standard 1 adjacent the outer face thereof. The pawl 61 is pivoted at its lower end to a bell crank lever 63 and its operative movement includes sliding and pivotal components, the said pawl being moved pivotally by a laterally disposed pin 64 arranged to exert a cam action on the upper end of said pawl in connection with the upward sliding movement thereof. The wheel 8 has the same number of teeth as each saw and it will be obvious that an upward movement of the pawl 61 will effect a movement of the saws through a distance corresponding to the interval of the teeth and in a clockwise direction, as shown by the arrow in Fig. 3. The bell crank lever 63 is pivoted as at 65 to the standard 1 and is connected by a link 66 to the lower end of the arm 60. The link 66 is preferably made in right- and left-threaded sections connected by a turn-buckle 67 in order that said link may be lengthened or shortened to accord with the adjustment of the arms 11 and 12 nearer to or farther from the standards 1 and 2.

The shaft 19 is rocked to operate the saw feeding mechanism by the carriage 27 when the latter reaches the limit of its movement in either direction. For this purpose, said carriage is provided with a cam roller 68, preferably mounted on the lower end of the pintle or rock shaft 50 which carries the spring 49, and the shaft 19 is provided adjacent its ends with arms 69 secured to said shaft by clamping collars 70 and having at their lower ends cam rollers 71 for engagement by the roller 68. The collars 70 are keyed on the shaft 19 and may be adjusted lengthwise thereof within certain limits in order that their spacing from one another may be made to accord with the variations in the lengths of different cylinders of saws. The rollers 71 are set in the rear of the roller 68 but project slightly into the path of said roller and when either of them is engaged by the roller 68 the shaft 19 will be rocked in a clockwise direction, as shown by the arrow in Fig. 3, to effect a rearward movement of the arm 60. It will be obvious that the rocking movement of the shaft 19 necessary to effect an operation of the saw feeding mechanism need be very slight but that the saw feeding mechanism will act positively in effecting the rotation of the saws for a distance corresponding to the full interval between adjacent teeth. The shaft 19 is reset after each rocking movement thereof to effect the operation of the saw feeding mechanism by a torsion spring 72 arranged on said shaft beyond the arm 12 and secured at one end to the arm 12 and at its other end to a collar 73 fast on said shaft. The resetting movement of the shaft 19 may be limited by the binding of the pawl 61 in the guide 62 as said pawl moves downward, as in the embodiment shown, or by any other suitable expedient.

The saw filing instrumentality preferably includes as an element thereof a rotary gummer 74 mounted at the lower end of a vertical shaft 75 which is supported for vertical adjustment in arms 76. The arms 76, which are preferably connected by a handle 81, project laterally from end extensions 77 of the motor casing and are rotatably adjustable about said extensions but are normally held against turning movement. For this purpose, each of said arms is made in companion halves which are connected together by bolt or screw fastenings 78 and are thereby securely clamped on the extension 77. The gummer shaft 75 has its bearings in bushings 79 which are threaded in collars at the outer ends of the arms 76 by the adjustment of which the gummer shaft and therewith the gummer may be set at any desired elevation. The gummer shaft carries at its upper end a helical gear wheel 80 which meshes with and is driven by the pinion 38 on the motor shaft 35, the length of said pinion being sufficient to compensate for different elevations at which the gear wheel 80 may be supported, in accordance with the adjustment of the elevation of the gummer 74.

The gummer 74 is normally disposed at one side of the grinding wheel 36, as shown in Fig. 3, and preferably operates on the row of teeth next above the row on which the wheel 36 operates, although, if desired, said gummer may be positioned to operate on the same row of teeth as the grinding wheel 36 or on a row of teeth located several rows above that on which the gummer 36 operates. The grinding wheel, as stated, grinds the front and back faces of the teeth and the gummer mills out the sharp corners at the base of the teeth.

The operation of the machine will be readily apparent from the foregoing description.

The gearing by which the carriage is moved along the track rail 26 produces a continuous movement of said carriage which, owing to the slight depth of the grinding cut, moves at substantially uniform speed. The grinding wheel, notwithstanding the continuous movement of the carriage, will remain in engagement with each tooth for a time amply sufficient to insure of the proper sharpening or grinding thereof. When the carriage reaches the limit of its movement at either end of the machine, its movement will be automatically reversed and it will then be shifted in the same manner toward the opposite end of the machine. Prior to the engagement of the grinding wheel and gummer with the saw teeth, the saw feeding mechanism will be operated in the manner described to positively feed the saws through a distance corresponding to the interval between adjacent teeth, it being noted that the spacing of the arms 11 and 12 is such as to provide clearances beyond the saws at each end of the gang in which the grinding wheel and gummer rotate idly while the saws are being shifted by the saw feeding mechanism.

While I have described but a single embodiment of the invention, which, as now considered, is preferred, it will be obvious that the invention admits of such variations and changes from the embodiment shown as may fall within the scope of the following claims.

I claim—

1. In a gin saw sharpening machine, in combination, a saw sharpening element, a movable carrier therefor, gearing for operating the carrier to cause a continuous movement thereof transversely of the gang of saws, and a motor for operating said element and said gearing.

2. In a gin saw sharpening machine, in combination, a saw sharpening element, a carrier therefor, a supporting element disposed transversely of the gang of saws and along which the carrier is movable, gearing between the carrier and the supporting element and means operating the carrier to produce a continuous movement thereof along the supporting element.

3. In a gin saw sharpening machine, in combination, a saw sharpening element, a carrier therefor, a supporting element disposed transversely of the gang of saws and along which the carrier is movable, gearing between the carrier and the supporting element and a motor supported by the carrier for operating said sharpening element and said gearing.

4. In a gin saw sharpening machine, in combination, a rotary grinding wheel acting on the front and back surfaces of the saw teeth, a motor therefor, a movable carrier for said element and motor, and means operated by said motor for effecting movement of the carrier transversely of the gang of saws.

5. In a gin saw sharpening machine, in combination, a saw sharpening element, a motor therefor, a carrier for said element and motor, a supporting element disposed transversely of the gang of saws and along which the carrier is movable and gearing between said carrier and said supporting element operable to produce a continuous movement of said carrier along said supporting element.

6. In a gin saw sharpening machine, in combination, a saw sharpening element, a carrier therefor, a supporting element disposed transversely of the gang of saws and along which the carrier is movable, automatic reversing gearing for effecting continuous movement of said carrier along said supporting element and devices co-acting with said gearing to operate the same in effecting reversal of the movement of the carrier when the carrier reaches the limit of its movement in either direction.

7. In a gin saw sharpening machine, in combination, a saw sharpening element, a movable carrier therefor, automatic reversing gearing for effecting continuous movement of said carrier transversely of the gang of saws and devices co-acting with said gearing to operate the same in effecting reversal of the movement of the carrier when the carrier reaches the limit of its movement in either direction.

8. In a gin saw sharpening machine, in combination, a saw sharpening element, a movable carrier therefor, automatic reversing gearing for effecting a continuous movement of said carrier transversely of the gang of saws, devices co-acting with said gearing to operate the same in effecting reversal of the movement of the carrier when the carrier reaches the limit of its movement in either direction and a motor supported by said carrier for operating said element and said gearing.

9. In a gin saw sharpening machine, in combination, a saw sharpening element, a movable carrier therefor, a motor, gearing operated by the motor for effecting continuous movement of the carrier transversely of the gang of saws and automatically operating means for causing the movement of the carrier to be reversed when the carrier reaches its limit of movement in either direction.

10. In a gin saw sharpening machine, in combination, a saw sharpening element, a movable carrier therefor, a motor for operating said element, gearing also operated by the motor for effecting continuous movement of the carrier transversely of the gang of saws and automatically operating means for causing the movement of the carrier to be reversed when the carrier reaches its limit of movement in either direction.

11. In a gin saw sharpening machine, in combination, a saw sharpening element, a movable carrier therefor, a motor supported by said carrier for operating said element, gearing also operated by the motor for effecting continuous movement of the carrier transversely of the gang of saws and means for causing the movement of the carrier to be reversed when the carrier reaches its limit of movement in either direction.

12. In a gin saw sharpening machine, in combination, a saw sharpening element, a movable carrier therefor, saw feeding means and means operated from said carrier as the latter reaches its limit of movement in either direction for operating said saw feeding means.

13. In a gin saw sharpening machine, in combination, a saw sharpening element, a movable carrier therefor, saw feeding means and means automatically operable when the carrier reaches its limit of movement in either direction for operating said saw feeding means.

14. In a gin saw sharpening machine, in combination, a saw sharpening element, a movable carrier therefor, saw feeding means, a rock shaft parallel to the path of movement of the carrier for operating said saw feeding means and companion elements on the carrier and the rock shaft for operating said rock shaft when the carrier reaches its limit of movement in either direction.

15. In a gin saw sharpening machine, in combination, a support for a cylinder of gin saws, a pair of arms pivotally mounted for movement toward and from said support, a saw sharpening element, a movable carrier therefor, a supporting element for said carrier extending between and supported by said arms and means for adjusting said arms about their pivots relatively to said support.

16. In a gin saw sharpening machine, in combination, a pair of standards constituting a support for a cylinder of gin saws, a pair of arms adjoining the respective standards and pivotally mounted at their lower ends for movement toward and from said standards, a saw sharpening element, a movable carrier therefor, a supporting element for said carrier extending between and supported by said arms and links connecting said arms and said standards.

17. In a gin saw sharpening machine, in combination, a pair of standards constituting a support for a cylinder of gin saws, a pair of arms adjoining the respective standards and pivotally mounted at their lower ends for movement toward and from said standards, a saw sharpening element, a movable carrier therefor, a supporting element for said carrier extending between and supported by said arms and connections between each of said arms and an adjacent standard including bearings swiveled in said arm and said standard and a link journaled in one of said bearings and having a threaded end working in the other bearing.

18. In a gin saw sharpening machine, in combination, a carrier, a supporting element along which the carrier is movable, an electric motor supported by the carrier, a grinding wheel mounted on an end of the motor shaft and gearing driven by the motor shaft for operating the carrier.

19. In a gin saw sharpening machine, in combination, a movable carrier, an electric motor supported thereby, a grinding wheel mounted on an end of the motor shaft, a rotary gummer supported in adjacency to said grinding wheel, gearing driven by the motor for operating the gummer and gearing driven by the motor shaft for operating the carrier.

20. In a gin saw sharpening machine, in combination, a grinding wheel operating on the front and back edges of the teeth, and a rotary gummer operating on the bases of the teeth.

21. In a gin saw sharpening machine, in combination, a grinding wheel operating on the front and back edges of the teeth, a rotary gummer operating on the bases of the teeth, a movable carrier for the grinding wheel and gummer and a motor for operating the grinding wheel and gummer.

22. In a gin saw sharpening machine, in combination, a grinding wheel operating on the front and back edges of the teeth, a rotary gummer operating on the bases of the teeth, a motor for operating the grinding wheel and gummer, a carrier for the grinding wheel, motor and gummer, a supporting element along which the carrier is movable and gearing driven by the motor for operating the carrier.

23. In a gin saw sharpening machine, in combination, an electric motor, a rotary gummer, a vertical shaft therefor, laterally projecting pivotally adjustable arms supporting the gummer shaft from the motor and gearing between the motor and the gummer shaft.

24. In a gin saw sharpening machine, in combination, an electric motor, a grinding wheel on one end of the motor shaft, a rotary gummer, a vertical shaft therefor, and gearing between the other end of the motor shaft and the gummer shaft.

25. In a gin saw sharpening machine, in combination, a carrier, a supporting element along which the carrier is movable, an electric motor supported by the carrier, a grinding wheel mounted on the inner end of the motor shaft and gearing for operating the carrier including a driving gear element mounted on the outer end of the motor shaft.

26. In a gin saw sharpening machine, in combination, a carrier, a supporting element along which the carrier is movable, an electric motor supported by the carrier, a grinding wheel mounted on the inner end of the motor shaft, gearing for operating the carrier including a driving gear element mounted on the outer end of the motor shaft, and a rotary gummer supported in adjacency to the grinding wheel and driven by said gear element.

27. In a gin saw sharpening machine, in combination, a movable carrier, a rack bar parallel to the path of movement of the carrier, a pinion carried by the carrier for engagement with said rack bar, a saw sharpening element and motor therefor supported by the carrier and gearing between said motor and said pinion.

28. In a gin saw sharpening machine, in combination, a track plate having a rail along its upper edge and rack teeth along its lower edge, a carrier having rollers working on said rail and a pinion engaging said rack teeth, a saw sharpening element and a motor therefor supported by the carrier, a vertical shaft supported by the carrier, reducing gearing for driving said pinion from said shaft and reducing gearing for driving said shaft from said motor.

29. In a gin saw sharpening machine, in combination, a saw sharpening element, a carrier therefor, a rack bar parallel to the path of movement of the carrier, and gearing carried by the carrier for effecting its operation including a pair of pinions engaging the rack bar, oppositely rotating gear wheels for driving the respective pinions, a common driving element for said gear wheels, clutch means between each pinion and its companion gear wheel, and means for simultaneously operating said clutch means to connect one pinion and its companion gear wheel and to disconnect the other pinion and its companion gear wheel.

30. In a gin saw sharpening machine, in combination, a saw sharpening element, a carrier therefor, a rack bar parallel to the path of movement of the carrier, and gearing carried by the carrier for effecting its operation including a pair of axially slidable pinions engaging the rack bar, gear wheels for driving the respective pinions, the shaft of each pinion projecting through its companion gear wheel, an intermediate gear for driving the gear wheels, a flat spring acting on the ends of the pinions, co-acting clutch teeth formed on each pinion and its companion gear wheel and a transversely reciprocatory reversing bar having recesses for the ends of the pinion shafts, said recesses having their spacing from one another less than the distance between the pinion shafts.

31. In a gin saw sharpening machine, in combination, a saw filing element, a carrier therefor, a supporting element along which the carrier is movable and spacing blocks carried by said supporting element to project between and laterally brace the gin saws.

32. In a gin saw sharpening machine, in combination, a saw filing element, a track plate having a projection which bears against the edges of the gin saws, spacing blocks carried by the said projection to extend between and laterally brace the gin saws, and a carrier for said element supported by and movable along said track plate.

33. In a gin saw sharpening machine, in combination, a saw sharpening element, a track plate, and a carrier for said element supported by and movable along said track plate, the track plate being pivotally adjustable about its longitudinal axial center whereby to vary the plane in which the saw sharpening element operates.

34. In a gin saw sharpening machine, in combination, a pair of pivotally mounted arms, a track plate extending between and supported by said arms, a saw sharpening element and a carrier for said element supported by and movable along said track plate.

35. In a gin saw sharpening machine, in combination, a saw sharpening element, a track plate, a carrier for said element supported by and movable along said track plate, supporting means for the track plate and means for adjusting the position of the track plate pivotally with relation to its supporting means.

36. In a gin saw sharpening machine, in combination, a saw sharpening element, a track plate, a carrier for said element supported by and movable along said track plate, arms providing end supports for said track plate, the track plate having end trunnions journaled in the arms and means carried by the arms for clamping said trunnions against pivotal movement.

37. In a gin saw sharpening machine, in combination, a saw sharpening element, a track plate, a carrier for said element supported by and movable along the track plate, pivotally mounted arms supporting the track plate and means for adjusting the position of the track plate pivotally with relation to said arms.

38. In a gin saw-sharpening machine, in combination, a saw-sharpening element, a carrier therefor, a supporting element along which the carrier is movable, pivotally mounted arms having clamps in which the ends of the supporting element are mounted for pivotal adjustment, the supporting element being thereby adjustable about its pivotal axis to vary the plane in which the saw-sharpening element operates, and means for adjusting the arms about their pivots to vary the spacing of the carrier relatively to the saws.

39. In a gin saw sharpening machine, in combination, a rock shaft, saw feeding means, operative connections between said rock shaft and said saw feeding means, a track plate parallel to said rock shaft, a saw sharpening element and a carrier for said element supported by and movable along said track plate.

40. In a gin saw sharpening machine, in combination, a rock shaft, saw feeding means, operative connections between said rock shaft and said saw feeding means, a track plate parallel to said rock shaft, a saw sharpening element, a carrier for said element supported by and movable along said track plate and co-acting devices on said carrier and said rock shaft for operating the latter when the carrier reaches the limit of its movement in either direction.

41. In a gin saw sharpening machine, in combination, end standards providing a support for a cylinder of saws, a ratchet wheel arranged adjacent one of said standards with its hub adapted to be made fast to the shaft of said cylinder, a pawl co-acting with said ratchet wheel, a saw sharpening element, a movable carrier therefor and means for operating said pawl when said carrier reaches its limit of movement in either direction.

42. In a gin saw sharpening machine, in combination, end standards providing a support for a cylinder of saws, a ratchet wheel arranged adjacent one of said standards with its hub adapted to be made fast to the shaft of said cylinder, a saw sharpening element, a movable carrier therefor, a pawl co-acting with said ratchet wheel and positively acting means operated by said carrier when the latter reaches its limit of movement in either direction for operating said pawl.

43. In a gin saw sharpening machine, in combination, a pair of standards providing a support for a cylinder of gin saws, a ratchet wheel arranged adjacent one of said standards with its hub adapted to be made fast to the shaft of said cylinder, a rock shaft, an arm projecting therefrom, a pawl co-acting with said ratchet wheel, operative connections between said arm and said pawl, a saw sharpening element, a carrier therefor and companion devices on said carrier and rock shaft for operating the latter from the carrier when the carrier reaches its limit of movement in either direction.

44. In a gin saw-sharpening machine, in combination, a rotary grinding wheel adapted to operate on the front and back surfaces of the saw teeth, a carrier therefor, a support disposed transversely of the gang of saws along which the carrier is movable, and means for continuously rotating the grinding wheel and for effecting the continuous movement of said carrier along said support.

In testimony whereof I have hereunto set my hand in presence of two subscribing witnesses.

ROBERT H. BUTTERS.

Witnesses:
M. F. BUTTERS,
CLIFF C. HATCHER.

Copies of this patent may be obtained for five cents each, by addressing the "Commissioner of Patents, Washington, D. C."